United States Patent [19]

Hicks

[11] Patent Number: 5,257,066
[45] Date of Patent: Oct. 26, 1993

[54] PIVOTING FILM DRIVE MOUNT

[76] Inventor: Ray Hicks, 2605 Corunna Rd., Flint, Mich. 48503

[21] Appl. No.: 919,914

[22] Filed: Jul. 27, 1992

Related U.S. Application Data

[63] Continuation of Ser. No. 815,398, Dec. 31, 1991, Pat. No. 5,146,266.

[51] Int. Cl.$^5$ .............................................. G03B 27/62
[52] U.S. Cl. ......................................... 355/75; 355/54; 352/80; 352/123; 352/50; 352/51; 352/52
[58] Field of Search ....................... 355/75, 54; 352/50, 352/51, 52, 80, 123

[56] References Cited

U.S. PATENT DOCUMENTS

Re. 28,046  6/1974  Renold ................................... 355/54
4,908,657  3/1990  Kogane ................................... 355/54

Primary Examiner—Monroe H. Hayes
Attorney, Agent, or Firm—Krass & Young

[57] ABSTRACT

A mounting assembly for a film drive unit used with photographic film printers. A mount base having a central aperture is adapted to be secured proximate the optical stage of a photographic printer. A pair of substantially parallel rails are attached to the mount base and oriented so as to lie substantially in the plane of the mount base. A pair of carrier blocks having upwardly projecting cradle portions are mounted for sliding movement on respective rails. An outwardly projecting keeper shaft is secured to the mount base and has a pair of keeper pins adapted to extend away from the shaft. A brace member supports a film drive assembly proximate the central aperture and has a pair of pins positioned on opposite sides so as to engage the cradle portions of corresponding carrier blocks. At least one spring-biased retaining element is disposed in the cradle portion of each carrier block. A selector mechanism is rotatably secured to the brace member via an outwardly extending selector shaft and has a plurality of outwardly extending tab members adapted to be secured at varying distances from the brace member. Each tab member is configured to releasably engage the keeper pins. This apparatus allows the position of the film drive relative said central aperture to be varied and to be pivoted as the pins of said brace member rotate within the cradle portions.

6 Claims, 2 Drawing Sheets

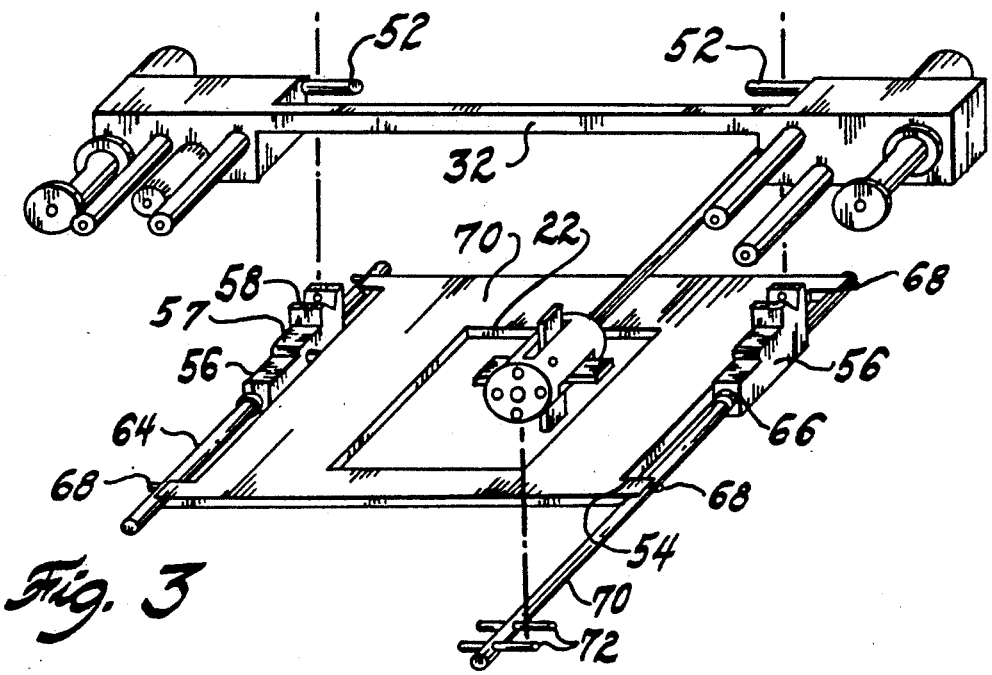
Fig. 3
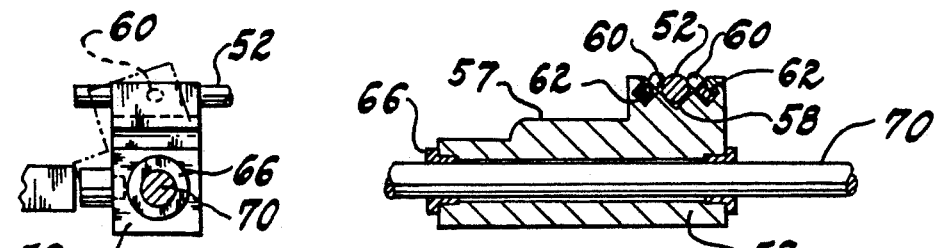
Fig. 6
Fig. 4
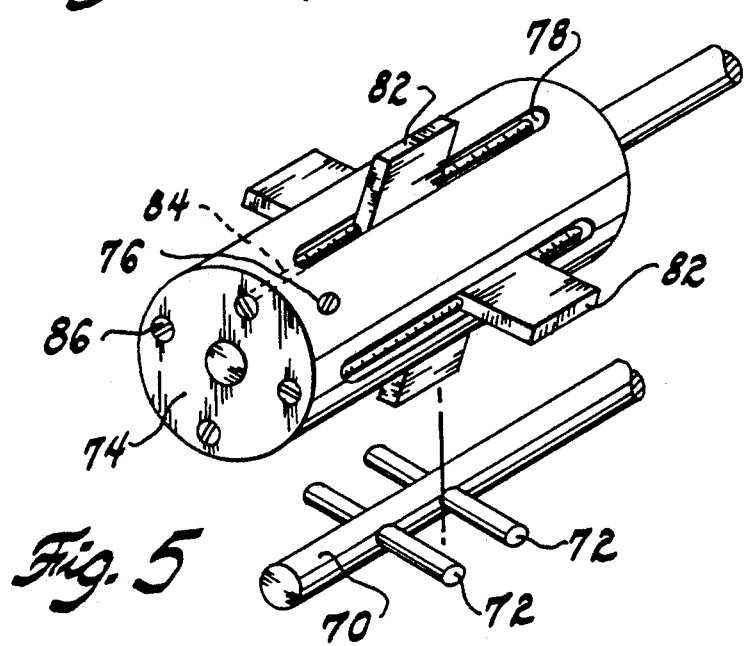
Fig. 5

PIVOTING FILM DRIVE MOUNT

This application is a continuation of application Ser. No. 815,398, filed Dec. 31, 1991, now U.S. Pat. No. 5,146,266.

FIELD OF THE INVENTION

The invention pertains to film drive mechanisms for photographic printers, and more particularly, to methods for attachment of film drive mechanisms to photographic printers.

BACKGROUND OF THE INVENTION

A commercial photographic processing laboratory requires the capability of making vast numbers of photographic prints from equally large numbers of photographic negatives. These photographic negatives are typically handled in long roll form, and are processed in photographic printers by mounting the long roll of negative film on mechanized film drives. Such commercial photographic printers may operate in both automated and semi-automated environments.

Most film drives for use with these photographic printers are either electrically or pneumatically powered. A continuous roll of exposed and developed photographic film is mounted on the feed spool of the film drive and routed across the optical state of a photographic printer. Individual negative frames are sequentially positioned at the optical stage of the photographic printer by operation of the drive components of the film drive so that one or more photographic prints can be made from each frame under either operator or machine control. Finally, the film is collected on a film take-up spool associated with the film drive.

Because photographic film is manufactured in a variety of different widths, a film drive needs to be capable of variably positioning the film in relation to the photographic printer. The longitudinal centerline of various types of photographic film can then be positioned to correspond with the optical center of the photographic printer.

A number of devices have been developed and utilized, with limited success, to provide the capacity for variably positioning the film in relation to the printer. In my patent application Ser. No. 359,851, filed May 31, 1989, I disclosed an apparatus consisting essentially of two nested brackets, one affixed to the printer work surface, and the second slidably affixed to the first. An alternate type, currently used in printers manufactured by Lucht Engineering, of Minneapolis, Minn., permits the entire drive assembly to slide longitudinally across a limited portion of the printer work station top surface. Both of these devices utilize electronic position sensing switches to relocate the film centerline which has not been entirely satisfactory as it requires sophisticated Hall effect magnetic sensor technology to function with the degree of reliability necessary in a commercial setting. Additionally, removal of the aforedescribed drive mechanisms is frequently time consuming and labor intensive. The present invention addresses these problems.

SUMMARY OF THE INVENTION

The present invention is a low profile, self-contained mounting assembly for a film drive unit used with photographic printers. A typical film drive unit carries conventional film feed and take-up spools, as well as tensioning and guide rollers. Electric or pneumatic motors serve to move film in long rolls through the film drive mechanism under either human or machine control. The improved apparatus of the within described device provides an easily removable means for variably positioning the film drive so as to position the longitudinal centerline of different film types along the optical centerline of the printer.

The mounting assembly of the present invention comprises a pivoting mount base positioned proximate the optical stage of a photographic printer. A pair of substantially parallel rails are attached to the mount base on opposite sides of a central aperture therein. A pair of carrier blocks are mounted for sliding movement on respective rails. A brace member is configured to removably engage the carrier blocks and includes a pair of pins positioned on opposite ends thereof which are oriented so that the axes of the pins are substantially co-linear. Further, the pins are positioned a sufficient distance apart so as to engage upwardly extending cradle portions located on corresponding carrier blocks. This structure allows a film drive mounted on the brace member to move laterally above the top surface of the printer as the carrier blocks slide along the rails to position the film centerline at various locations along the optical centerline. This structure also allows the film drive to be slid outwardly and pivoted about the pins retained within the cradle portions to allow easy access to the film drive components when threading film thereon.

In the preferred embodiment, the mount base is adapted to pivot so as to be capable of disposing a frame of film in either landscape or portrait formats for use by the printer.

The carrier blocks preferably engage respective rails via throughbores formed therein. Bearing members in the throughbores allow relatively frictionless movement of the blocks along the rails. Further, the carrier blocks are configured to include a substantially planar shelf portion adapted to support the brace member apart from the cradle portion. Such a shelf portion provides the main support foundation for the brace member and film drive during operation of the photographic printer apart from the cradle portion of the carrier block.

Further in the preferred embodiment, at least one spring-biased retaining element is disposed in the cradle portion of each carrier block to removably secure the brace member to the carrier blocks while allowing for pivotable motion about the axis of the pins. More preferably, a pair of spring-biased retaining elements are disposed on opposite sides of each cradle portion for adequate rotatable engagement with the pins. The retaining elements are preferably configured as a spring biased ball elements which allow for smooth rotation of the pins in the cradle portions.

The present invention further comprises a mounting assembly having an outwardly projecting keeper shaft secured to the mount base. A keeper mechanism is secured to this keeper shaft a known distance from the mount base. A corresponding selector mechanism is rotatably secured to the brace member through an outwardly extending selector shaft. The selector mechanism has a plurality of outwardly extending tab members configured to releasably engage the keeper mechanism. By having each tab member secured at varying distances from the brace member, the apparatus allows for manual positioning of the film drive relative the central aperture. One of the tab members is manually positioned for releasable engagement with the keeper mechanism by sliding the brace member on the carrier blocks to the appropriate position relative the mount base. Once a tab member engages the keeper mechanism, the film drive is fixed in place.

In the preferred embodiment, the keeper mechanism comprises a pair of keeper pins spaced apart and extending substantially parallel to one another away from the keeper shaft. The tab members are configured to be positioned between the keeper pins and bear upon at least one of the pins to releasably secure the tab member in place.

The selector mechanism is preferably rotatable about the axis of the selector shaft to allow for selection of individual tab members for use in positioning the apparatus. To accomplish such rotation, the selector mechanism may be rotatably secured to the selector shaft by suitable bearing structures in the selector mechanism itself. Alternatively, the selector shaft may be rotatably secured to the brace member by suitable bearing structures in the brace member. In either event, the end result is the ability of the selector mechanism to rotate about the axis of the selector shaft so that various tab members projecting from various locations about the selector mechanism may be selected for use with the keeper mechanism.

In the preferred embodiment, the selector mechanism includes a plurality of substantially parallel slots. A corresponding plurality of threaded shafts are disposed in the slots and the tab members are threadably secured to respective shafts so as to extend outwardly from the selector mechanism at intervals thereabout. Each threaded shaft has a slotted end terminating at the outer surface of the selector mechanism to allow for manual rotation thereof using a conventional screwdriver. Rotation of the threaded shafts moves the tab members along the selector mechanism to accurately position the tab members at various distances from the brace member.

Thus, the most preferred embodiment of the present invention provides a mounting assembly which includes a pivoting mount base having a central aperture therein and which is adapted to be secured proximate the optical stage of a photographic printer. A pair of substantially parallel rails are attached to the mount base on opposite sides of the mount base so as to lie substantially in the plane of the mount base. A pair of carrier blocks are mounted for sliding movement on respective rails and each block has an upwardly projecting cradle portion. One of the rails projects outwardly from the base to form a keeper shaft having a pair of keeper pins secured thereto. The brace member is adapted to support a film drive assembly proximate the central aperture and has a pair of pins positioned on opposite sides oriented substantially co-linearly with respect to one another so as to engage the cradle portions of corresponding carrier blocks. At least one spring-biased retaining element is disposed in the cradle portion of each carrier block. A selector mechanism is rotatably secured to the brace member through an outwardly extending selector shaft. The selector mechanism has a plurality of outwardly extending tab members adapted to be secured at varying distances from the brace member and further configured to releasably engage the keeper pins. This apparatus allows the position of the film drive relative the central opening to be varied by manipulating the selector mechanism to position a selected one of the tab members in releasable engagement with the keeper pins. This apparatus also allows a film drive mounted on the brace member to be slid outwardly and pivoted about the pins of the brace member held within the cradle portions of the slide blocks.

BRIEF DESCRIPTION OF THE DRAWINGS

These and other objects of the invention will be clear from the description of the preferred embodiment which follows, and from the drawings, in which:

FIG. 3 is an exploded view of the film drive mechanism in relation to the photographic printer pivoting mount;

FIG. 4 is a detailed side view of a carrier block, showing this relationship to the associated keepers; and FIG. 5 is a detailed perspective view of the selector/keeper mechanism of the present invention.

FIG. 6 is a further detailed view of the carrier block.

DESCRIPTION OF THE PREFERRED EMBODIMENT

Figures 1, 2:
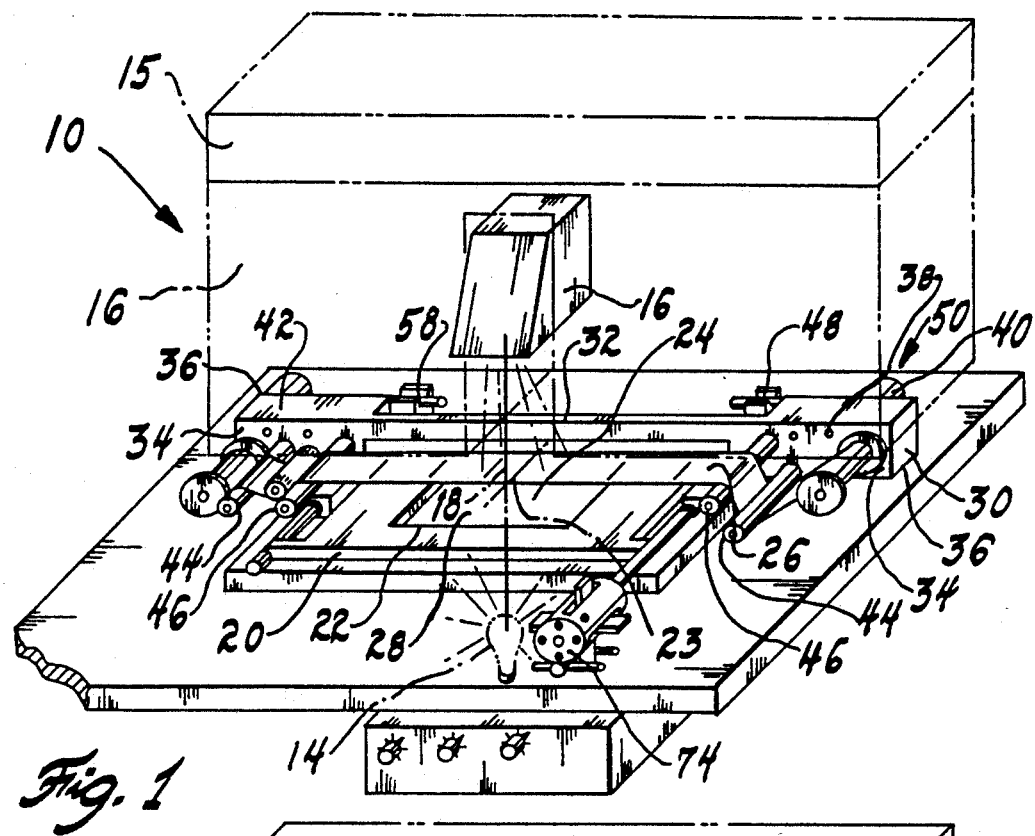
FIG. 1 is a perspective view of the film drive mount assembly in place on a photographic printer.
FIG. 2 is a perspective view of the film drive mount assembly in a pivoted configuration on a photographic printer.

The present invention provides a mechanism adapted to secure a film drive to the top surface of a commercial photographic printer. The operator may selectively position the film drive mechanism relative to the optical centerline of the printer without using electronic sensing and positioning devices. Further, the drive assembly is quickly removable from the printer for installation of film, maintenance, and the like.

Referring now to FIG. 1, a typical photographic printer 10 takes the form of a commercial work station. A film drive is mounted on the top surface 12 for positioning film frames proximate the optical stage of the printer. A light-proof photographic paper drive cabinet 15 is positioned above the top surface 12 of the work station. The cabinet contains photographic paper and an associated drive mechanism which permits sequential exposure of photographic prints from a corresponding collection of negatives. A lens deck 16 containing a plurality of lenses is suspended between the top surface 12 and the photographic paper cabinet 17 to project the photographic image of the frame of film onto the photographic paper.

The typical photographic printer is provided with an illumination source 14 below the work station top surface 12. An opening in the work station top surface permits light from the illumination source 14 to shine through a substantially quadrangular mount base 20 affixed to the work station top surface 12. The pivoting mount 20 is designed to pivot ninety degrees in a plane above the surface of the work station to allow film negatives 26 positioned over the aperture 22 to be exposed in either the landscape or portrait formats. Typically, pivoting mount base 20 is constructed of aluminum or other metal, and is provided with a glass or a plastic lens 28 disposed in a central aperture 22. The lens may be either transparent or translucent and provides an even diffusion of illumination across the dimensions of the film negative 26 to insure a reliable and even exposure. The geometric center line 23 of the central aperture 22 which extends transverse to the film 26 corresponds to the optical center of the various lenses contained within the lens deck 16. This physical position is referred to as the optical center line 18 of the printer.

A film drive assembly 30 is mounted on the pivoting mount 20 by physical connection of the film drive 30 to a pair of carrier blocks 56. The carrier blocks 56 are slidably attached to a polished metal rail 64 and an extended polished metal rail 70, which are in turn affixed by fasteners to opposing sides of the pivoting mount base 20. Relieved sections 54 in the mount base are provided to limit the travel of carrier blocks 56 along the rails.

The film drive mechanism 30 comprises a main structural brace member 32, to which are attached front brackets 34 and rear brackets 36. The various components of the film drive assembly are affixed to these brackets. For example, a film drive shaft is driven by a film drive motor 40. A spool of film is secured to the film drive shaft. The feed end of the film is routed over tensioning roller 44, and through positioning roller 46, and thereafter, is routed across section film drive roller 46, second film tensioning roller 44, to film take-up spool. Film take-up spool is secured to film take-up drive shaft, which is in turn driven by film take-up motor through drive train 42. In this fashion, a continuous roll of photographic film is fed between two spaced apart guide rollers in such a fashion as to permit the film to be suspended immediately over the aperture 22. Power to the film drive and take-up motors is provided through electrical wiring harness 50, or, in the alternative, by pneumatic power distribution tubes. The photographic film may, accordingly, be selectively positioned between the film guide rollers, permitting a single photographic negative exposure to be positioned near the optical centerline of the photographic printer, when the drive assembly is in place on the pivoting mount.

The method of attaching the film drive mechanism will be better understood by reference to FIGS. 2 and 3. Polished metal rails 64 and 70 are affixed to opposing sides of pivoting mount base 20 with suitable attachment fasteners 68. Carrier blocks 56 are provided with throughbores, in which are mounted bearing members (not shown) to slidably engage rails 64 and 70. Pivoting mount 20 is provided with relieved sections 54 to accommodate and define the limits of movement of carrier blocks 56. In this fashion, the carrier blocks 56 are free to slide longitudinally in relation to opposing sides of pivoting mount base 20 restricted by the dimensions of relieved sections 54. The relieved sections 54 restrict or limit the movement of the carrier blocks along the rails, but are preferably configured to allow the film drive 30 to be slid outwardly beyond the front face of the lens deck for ease in loading and unloading film.

Each carrier block 56 is further provided with a shelf portion 57 and cradle portion 58. The cradle portion 58 extends upwardly away from the shelf portion 57 at the rear end of each carrier block 56. The film drive assembly brace member 32 is provided with a pair of pivot pins 52 having a substantially common axis. Each pivot pin 52 is sized to fit securely in a corresponding cradle portion 58. With reference to FIGS. 4 and 6, it can be seen that each carrier block is provided with a pair of spring ball assemblies on respective opposite sides thereof. The spring retainer balls 60 are biased outwardly by spring members 62 and are oriented in each cradle portion 58 so as to be positioned above the midpoint of each pin 52 and on opposite sides thereof. In this manner, the ball elements 60 releasably secure pivot pins 52 within cradle 58 while allowing for rotation of the pins 52 in the cradle itself. Thus, the film drive assembly 30 may rest on the shelf portions 57 or be pivoted upward away from the carrier blocks within the space defined by the upper surface of the pivoting mount/carrier block assembly, and the lower surface of the lens deck 16.

With reference also to FIG. 5, the forward portion 70a of extended rail 70 comprises a keeper shaft and is provided with a pair of keepers 72. The distance between keepers 72 and the optical centerline 18 of the photographic printer corresponds to a known dimension. The space between keepers 72 corresponds generally to the width of outwardly extending tab members 82 mounted on a selector block 74. Selector block 74 is attached to a selector block shaft which is rotatably attached to the brace member of the film drive assembly through suitable bearing mechanisms (not shown). Selector block 74 is releasably secured to selector block shaft through a set screw 76. Loosening set screw 76 permits selector block 74 to be positioned longitudinally on selector block shaft.

Selector block 74 is provided with four slots 78. A corresponding plurality of threaded shafts 84 are disposed in the slots 78. The threaded shafts 84 have a slotted end 86 terminating at the outer surface of the selector mechanism to allow for manual rotation thereof. The tab members 82 are secured to respective threaded shafts 84 such that they extend outwardly from the selector block 74 at intervals thereabout. The tab members 82 are moved along the selector block 74 at various distances from the brace member by rotation of the threaded shafts 84.

In use, the invention must be manually calibrated for the various film sizes to be utilized. Each tab member 82 can be sequentially set for a different known film size depending on the dimensions of the photographic printer and mount apparatus. Once this is accomplished, an operator can select the appropriate position for the film drive by pivoting the brace member upward, selecting the appropriate tab member, and positioning the brace member to allow the selected tab member to engage the keepers and, thus fix the position of the film drive relative the mount base and photographic printer. This apparatus also allows an operator to slide the film drive outwardly along the top surface of the work station and pivot the brace member to expose the film drive for easy access, film loading, maintenance, and the like.

Having thus described my invention, it will be seen that numerous alternative embodiments of the invention can be envisioned without departing from the invention as defined in the following claims. For example, rails herein are defined so as to include rods, shafts, and other suitable bearing surfaces, any number of tab members may be utilized on the selector mechanism to provide for a number of film sizes as required, and the selector block may be rotatably secured to the selector shaft.

I now claim:

1. A mounting assembly for a film drive unit used with commercial photographic equipment of the type including an optical stage defining an optical centerline, the film drive unit including an elongated frame member, a film feed spool mounted on one end of the frame member, a take-up spool mounted on the other end of the frame member, and guide means for moving the film between the spools along a longitudinal path, the mounting assembly comprising:

a mount base having a central aperture therein and adapted to be secured proximate the optical stage of the photographic equipment;

a pair of rails attached to opposite sides of said mount base;

a carrier block mounted for sliding movement on each rail and having an upwardly projecting cradle portion; and means on each carrier block for pivotally supporting a respective end of the frame member of the film drive unit with the longitudinal film path positioned over the base aperture, whereby the film drive unit may be slide laterally along the rails on the carrier blocks to adjust the lateral position of the longitudinal centerline of the film path relative to the optical centerline of the photographic equipment and the film drive unit may be pivoted relative to the mount plate in any position of lateral adjustment of the film drive unit to facilitate access to the film.

2. A mounting assembly for a film drive unit used with commercial photographic equipment of the type including an optical stage defining an optical centerline, the film drive unit including an elongated frame member, a film feed spool mounted at one end of the frame member, a take-up spool mounted on the other end of the frame member, and guide means for moving the film between the spools along a longitudinal path, the mounting assembly comprising:

a mount base having a central aperture therein and adapted to be secured proximate the optical stage of a photographic printer;

means on said mount base for supporting the opposite ends of the film drive unit frame member with the film path passing over the mount base opening;

further means on said mount base for moving the film drive unit laterally on the mount base to move the longitudinal centerline of the film path relative to the optical centerline of the photographic equipment; and a selector mechanism including a selector member adapted to be connected to the film drive unit frame member and extending laterally therefrom and means on the mount base coacting with said selector mechanism to secure the film drive unit in any position of lateral adjustment on the mount base.

3. A mounting assembly according to claim 2 wherein:

said selector member is connected to the frame member of the film drive unit by a laterally extending shaft;

said coating means includes a keeper shaft extending laterally from said mount base and keeper means on the keeper shaft; and said selector member includes a plurality of individually adjustable outwardly extending tab members for selective coaction with the keeper means on the keeper shaft.

4. A mounting assembly according to claim 3 wherein:

the film drive unit is mounted for pivotal movement on the mount base so as to pivotally move the selector member away from the keeper means to facilitate changing of the laterally adjusted position of the film drive unit.

5. A film drive assembly for use with commercial photographic equipment of the type including an optical stage defining an optical centerline, the assembly comprising:

a film drive unit including an elongated frame member, a film feed spool mounted on one end of the frame member, a take-up spool mounted on the other end of the frame member, and guide means for moving the film between the spools along a longitudinal path;

a mount base having a central aperture therein adapted to be positioned proximate the optical stage of the photographic equipment;

mounting means including first mounting means mounting the film drive unit on the mount base with the longitudinal path of the film passing over the mount base opening and second mounting means for moving the film drive unit laterally on the mount base to move the longitudinal centerline of the film path relative to the optical centerline of the photographic equipment; and a selector mechanism including coacting means on the mount base and on the film drive unit operative to selectively secure the film drive unit in a plurality of lateral positions relative to the optical centerline of the photographic equipment and thereby selectively and adjustably position the longitudinal centerline of the film path relative to the optical centerline of the photographic equipment to accommodate varying film widths.

6. An assembly according to claim 5 wherein:

the mounting means further includes third mounting means mounting the film drive unit for pivotal movement relative to the mount base; and the coating selector mechanism means are moved into and out of securing coaction in response to pivotal movement of the film drive unit on the mount base.

* * * * *